United States Patent [19]
Miller et al.

[11] 3,857,273
[45] Dec. 31, 1974

[54] TOOTHED FORMING TOOL

[75] Inventors: Robert L. Miller, Warren; Louis M. Fisset, Roseville, both of Mich.

[73] Assignee: Ex-Cell-O Corporation, Highland Park, Mich.

[22] Filed: June 22, 1973

[21] Appl. No.: 372,683

[52] U.S. Cl. .............................................. 72/469
[51] Int. Cl. .............................................. B21d 5/02
[58] Field of Search ........................ 72/469, 88, 90

[56] References Cited
UNITED STATES PATENTS

| | | | |
|---|---|---|---|
| 440,763 | 11/1890 | Simonds | 72/88 |
| 2,994,237 | 8/1961 | Pelphrey | 72/469 |
| 3,015,243 | 1/1962 | Drader | 72/469 |
| 3,084,572 | 4/1963 | Stark | 72/88 |
| 3,789,643 | 2/1974 | Dickson | 72/469 |

Primary Examiner—Milton S. Mehr
Attorney, Agent, or Firm—Malcolm R. McKinnon

[57] ABSTRACT

A toothed forming tool for pressure forming spline teeth, gear teeth and the like on the periphery of a cylindrical workpiece, the relationships of the teeth on the tool with respect to each other being improved whereby the useful life of the tool is increased and flow characteristics of the workpiece material are improved during the process of generating teeth on the workpiece.

11 Claims, 6 Drawing Figures

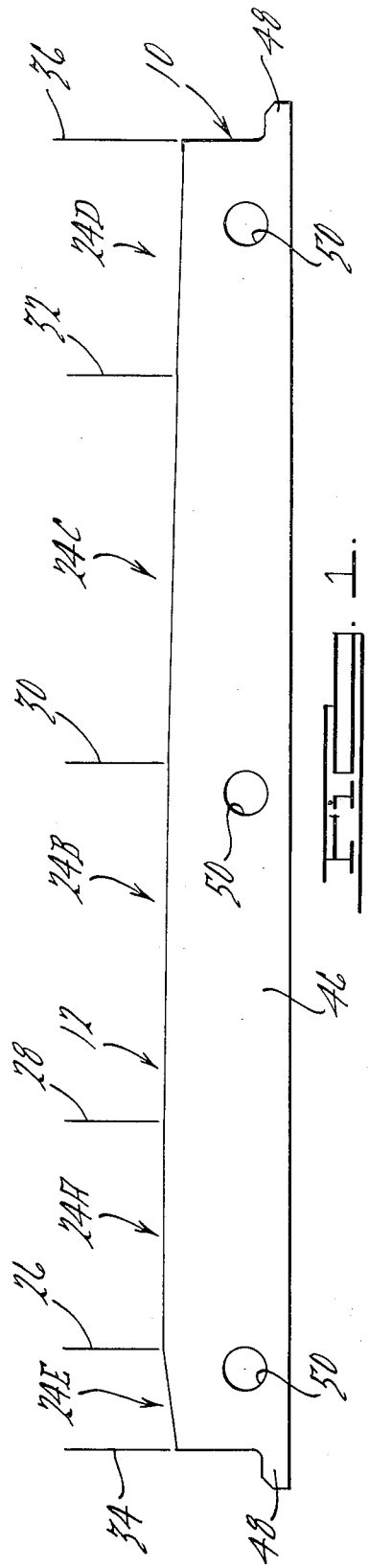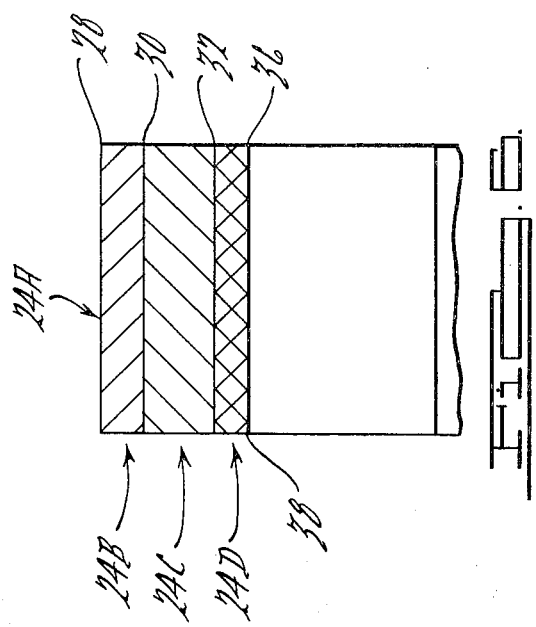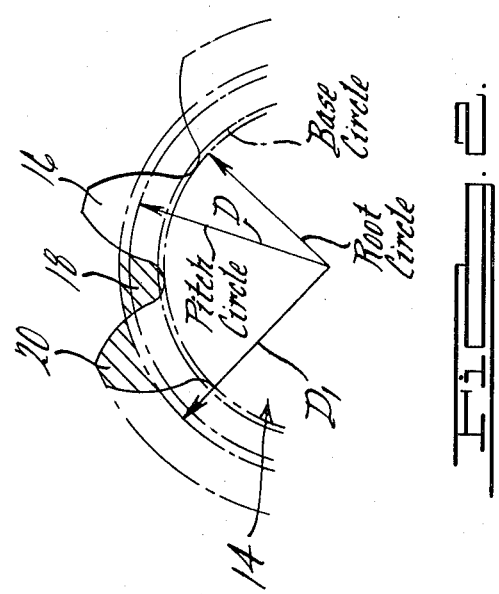

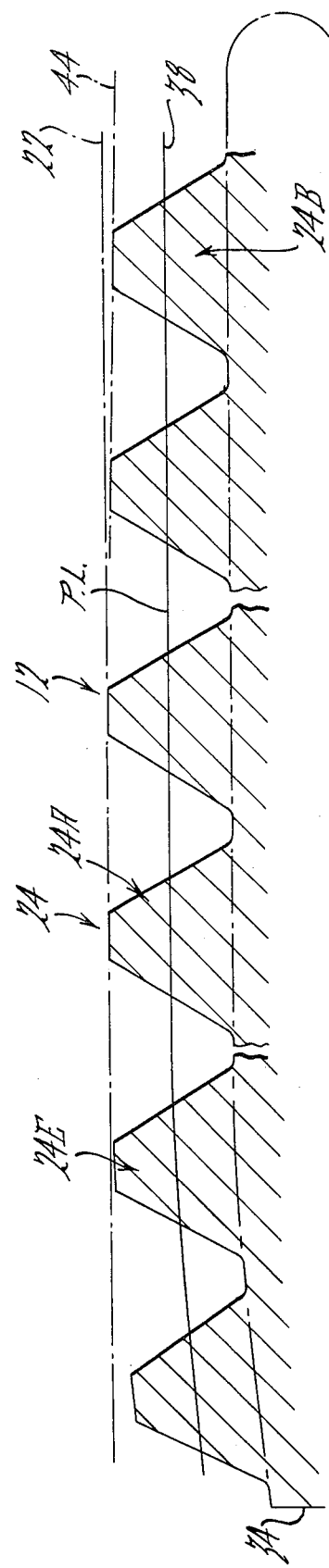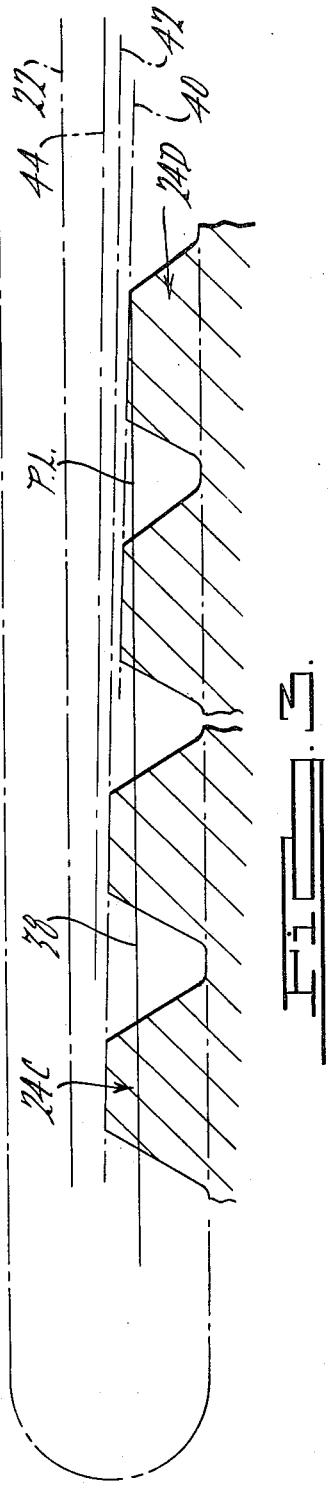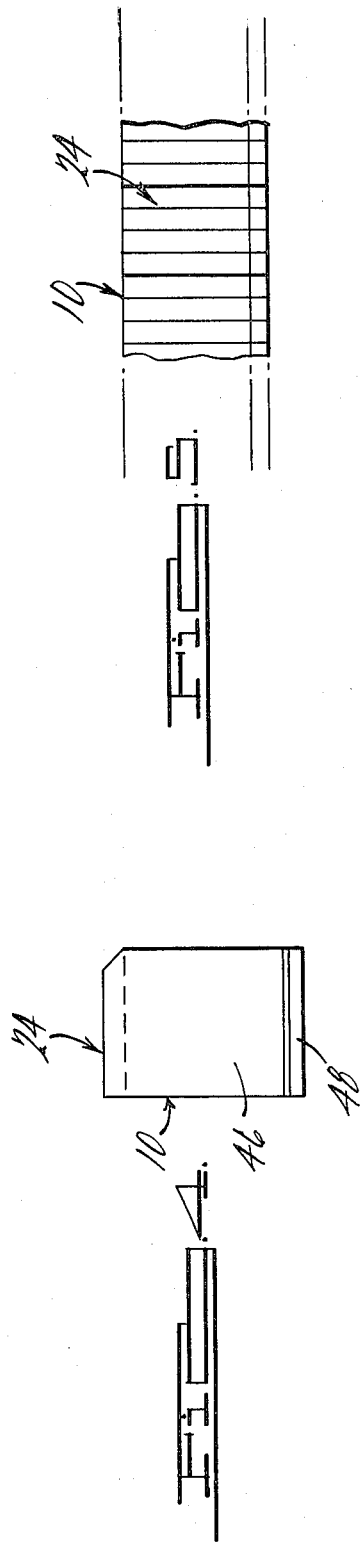

TOOTHED FORMING TOOL

BRIEF SUMMARY OF THE INVENTION

This invention relates to tools for pressure forming toothed elements and, more particularly, to an improved tool for pressure generating teeth, such as spline teeth, gear teeth, worm teeth, and the like, on the periphery of cylindrical workpieces while the workpieces are at ambient or room temperature and without removal of material from the workpieces. Heretofore, various tools have been utilized commercially to pressure form spline teeth, gear teeth, worm teeth, and the like on the periphery of a cylindrical workpiece while the workpiece is at ambient or room temperature without removing material from the workpiece. Examples of prior art tools which have achieved commercial success in this field are disclosed in U.S. Pat. Nos. 2,994,237 and 3,015,243, such tools being utilized in machines of the type disclosed in U.S. Pat. No. 2,995,964.

An object of the present invention is to provide an improved tooth forming tool of the indicated character incorporating improved tooth forming means for generating teeth on a workpiece whereby the useful life of the tool is extended.

Another object of the invention is to provide an improved tool for pressure generating teeth on workpieces which improves the quality of the workpieces and at the same time reduces the cost of manufacture thereof.

Still another object of the invention is to provide an improved tooth forming tool incorporating improved tooth generating means which improves the flow characteristics of the workpiece material during the process of generating teeth in the workpiece.

The above as well as other objects and advantages of the present invention will become apparent from the following description, the appended claims and the accompanying drawings.

BRIEF DESCRIPTION OF THE DRAWINGS

FIG. 1 is a side elevational view of a rack type tool embodying the present invention;

FIG. 2 is a fragmentary view of a typical involute spline that can be pressure formed by tools embodying the present invention;

FIG. 3 is an enlarged, fragmentary and diagrammatic side elevational view of the teeth of the tool illustrated in FIG. 1;

FIG. 4 is an elevational view of the left end of the tool illustrated in FIG. 1;

FIG. 5 is a fragmentary, top plan view of the tool illustrated in FIG. 1; and

FIG. 6 is a schematic, superimposed view of the teeth of the tool illustrated in FIG. 1.

DETAILED DESCRIPTION

Referring to the drawings, a preferred embodiment of the invention is illustrated in FIGS. 1, 3, 4, 5 and 6 thereof. The illustrated embodiment of the invention comprises a specific tooth construction for rack type tools generally designated 10, which tools may be utilized in identical pairs to pressure form involute spline teeth, involute gear teeth and the like, as well as other types of teeth on the periphery of a cylindrical workpiece. A machine in which a pair of rack type tools embodying the present invention may be utilized to pressure form a workpiece by metal displacement is described in detail in the aforementioned U.S. Pat. No. 2,995,964 although it will be understood that tools embodying the present invention may be utilized in other types of machines. In general, a workpiece is positioned between a pair of tools 10 embodying the present invention, the tools being reciprocated in opposite directions across the workpiece to form teeth on the periphery of the workpiece. The workpiece is preferably supported by means which permit it to rotate freely about the longitudinal axis of the workpiece when urged to do so by tools embodying the present invention. The tools 10 are provided with teeth, generally designated 24, on their working faces that engage the periphery of the workpiece and, in use, the tools are moved lengthwise by suitable means effective to move the tools simultaneously in opposite directions at the same velocity. The space between the working faces of the tools is less than the diameter of the workpiece with the result that the configuration of the working faces of the tools is impressed or conjugated on the periphery of the workpiece.

In forming teeth of the desired configuration on the periphery of the workpiece, the material from which the workpiece is made (ordinarily steel) will flow adjacent the surface in radial and tangential directions so that there are grooves of less diameter than the original outside diameter of the workpiece and ridges of greater diameter than the original outside diameter of the workpiece. Since the final configuration of the workpiece must be accurately maintained, this flow of material should be taken into account in selecting the diameter of that portion of the workpiece which is subjected to the action of the tools embodying the present invention.

To illustrate by consideration of a common but very important shape that may be rolled by tools embodying the present invention, there is shown in FIG. 2 a portion of a cross-section of a workpiece 14 in finished form in which the workpiece has involute teeth or splines 16. Since no metal is removed in the cold rolling operation, the diameter of the workpiece prior to rolling cannot be either the final outside diameter or the root diameter. The rolling diameter $D_1$ of the workpiece 14 is selected so that the area 18 of removed tooth material below the $D_1$ periphery is equal to the area 20 of tooth material on a greater diameter than $D_1$. The diameter $D_1$, or substantially this diameter, defines the pitch line for rack type tools such as the tools 10. As will be described hereinafter in greater detail, the pressure angle or angle of obliquity of certain of the teeth of the tools 10 is the angle whose cosine is $D/D_1$ multiplied by the cosine of the pressure angle at the pitch diameter of the teeth 16 where D is the pitch diameter of the workpiece 14. The base pitch of the tools and the workpiece is identical. With such a construction, the linear pitch of the teeth on the tool, as measured on the pitch line thereof, corresponds with the circular pitch of the teeth on the workpiece, as measured on a circle having the diameter $D_1$ of the workpiece. The whole depth of at least some of the teeth on the tools 10 which engage the workpiece 14 is preferably the same as that of the workpiece, i.e., such tool teeth are fully conjugate to the teeth on the workpiece.

In use, a pair of tools 10 are spaced apart so that at a position near the trailing ends thereof, the working faces of the tools provide a clearance equal to the root diameter of the workpiece 14 less a few thousandths of an inch to take up elasticity of the members and compression of oil films under rolling pressure. Only one pass of the tools with no reversal of direction during the working stroke is preferred.

In accordance with the present invention, the spacing between the working faces of the tools is regulated in a unique manner so that the depth of the impressions made in the workpiece increases at a controlled varying rate as the rolling operation proceeds. That is to say that the working faces of the tools approach closer together at a varying rate toward the longitudinal axis of the workpiece as the length of the stroke increases. This "approach" may be regarded as a varying feed of the tools into the workpiece as the tools move longitudinally relative to the workpiece. In accordance with the present invention, the convergence of the tool faces toward each other is accomplished by varying the rate of penetration of successive sections of the tool teeth into the workpiece while maintaining the pitch line of all sections of the tool teeth from the leading end of the tool to and including the section containing the fully conjugate teeth constant, a divergent section of the teeth being provided between the section containing the fully conjugate teeth and the trailing end of the tool to provide relief at the end of the working stroke of the tool.

FIGS. 1, 3, 4, 5 and 6 illustrate a tool 10 embodying the present invention, it being understood that the tooth formation of the mating tool will be substantially identical. The numeral 22 designates a theoretical reference line which shows a "no taper" condition so that if the tops of the teeth on the tool remained on the line 22 there would be no change in spacing between the working faces of the tools as the tools moved relative to each other across the periphery of the workpiece. The teeth of the tool 10 are designated generally by the numeral 24 and, in the preferred embodiment of the invention illustrated, the teeth 24 are divided into five sections delineated by the vertical reference lines 26, 28, 30 and 32 and the trailing and leading ends 34 and 36, respectively of the tool. As shown in FIG. 3, the pitch line 38 of all of the tool teeth 24 is parallel to the reference line 22 from the leading end 36 of the tool 10 to the reference line 26, and the pitch line of the tool teeth 24 tapers downwardly away from the reference line 22 from the reference line 26 to the trailing end 34 of the tool. The tops of the tool teeth in the sections between the reference line 28 and the leading end 36 of the tool taper downwardly at varying rates in successive sections toward the leading end of the tool while the pitch line of the teeth in the sections of teeth between the reference line 26 and the leading end 36 of the tool remains parallel to the reference line 32. In accordance with the teaching of U.S. Pat. No. 3,015,243, the teeth 24A between the reference lines 26 and 28 are full sized and fully conjugate to the teeth to be formed on the workpiece and the pressure angle or angle of obliquity of the teeth 24A is the angle whose cosine is $D/D_1$ multiplied by the cosine of the pressure angle at the pitch diameter of the teeth to be formed on the workpiece where D is the pitch diameter of the teeth of the workpiece. The teeth 24A between the reference lines 26 and 28 conjugate the final form of the teeth on the workpiece. Also, in accordance with the teachings of U.S. Pat. No. 3,015,243, and as previously mentioned, the pitch line of the teeth 24E between the reference line 26 and the trailing end 34 of the rack tapers downwardly away from the reference line 22 and the teeth 24E between reference line 26 and trailing end 34, while being substantially full sized, are also relieved on the sides or flank faces thereof. This relief eliminates seam lines and other errors that might otherwise be formed on the teeth of the workpiece at the end of the stroke due to the decreased total area of the contact between the tools and the workpiece as the rolling pressures are reduced at the end of the stroke.

In accordance with the present invention, the pitch line of all of the teeth on the tool between reference line 26 and the leading end 36 of the tool is determined by the diameter $D_1$ of the workpiece in the manner previously described so that linear pitch of the teeth on the tool, as measured on the pitch line thereof, corresponds with the circular pitch of the teeth on the workpiece as measured on a circle having the diameter $D_1$ of the workpiece. The pressure angle of all of the teeth between the reference line 26 and the leading end of the tool 36 is the angle whose cosine is $D/D_1$ multiplied by the cosine of the pressure angle at the pitch diameter of the teeth on the workpiece where D is the conventional pitch diameter of the workpiece. The base pitch of the tools and the workpiece is identical. With such a construction, the linear pitch of the teeth on the tool, as measured on the pitch line thereof, corresponds with the circular pitch of the teeth on the workpiece as measured on a circle having the diameter $D_1$ of the workpiece. The whole depth of the teeth 24A between the reference lines 26 and 28 if preferably the same as that of the workpiece so that the teeth 24A are fully conjugate to the teeth on the workpiece.

In accordance with the present invention, the top lands of the teeth between the reference line 28 and the leading end 36 of the tool 10 are tapered downwardly towards the leading end 36 of the rack at varying rates while the pitch line of such teeth remains parallel to the reference line 22 as previously mentioned, the various tapers being provided by removing the theoretical addenda of the teeth, as by grinding the teeth on a taper. The top land of the leading tooth adjacent the leading end 36 of the rack may be located substantially at the pitch line 38 of the rack as shown, or may, for example, be disposed a half to a few thousandths of an inch above the pitch line. The portions of the teeth between the reference line 32 and the leading end 36 are relatively shallow, relatively wide and the leading edges have sharp corners as shown in FIG. 3, the sharp corners serving to grip the workpiece and initiate rotation thereof. The length of the zone of teeth 24D between the reference line 32 and the leading end 36 is preferably such that one complete revolution of the workpiece is achieved in such zone. The top lands of teeth 24D in the zone between the reference line 32 and the leading end 36 slope upwardly toward the full sized teeth 24A, as indicated by the reference line 40, at a relatively steep angle whereby approximately 20 to 25 percent of the desired depth of penetration of the workpiece is achieved in the zone of the teeth 24D during one revolution of the workpiece, the depth of penetration being defined as the distance between the diameter $D_1$ of the workpiece and the root diameter of the workpiece teeth.

The length of the zone of teeth 24C between the reference lines 30 and 32 is preferably such that two or more complete revolutions of the workpiece are achieved in the zone containing the teeth 24C and the top lands of the teeth 24C in such zone slope upwardly toward the full size teeth 24A as indicated by the reference line 42, at a lesser angle than the angle of the top lands of the teeth 24D whereby an additional approximately 45 percent of the desired depth of penetration of the workpiece is achieved in the zone containing the teeth 24C. Thus, the teeth 24D and 24C account for approximately 65 to 70 percent of the total desired depth of penetration of the workpiece.

The length of the zone of teeth 24B between the reference lines 28 and 30 is also preferably such that two or more complete revolutions of the workpiece are achieved in such zone and the top lands of the teeth 24B slope upwardly, as indicated by the reference line 44, toward the full size teeth 24A at a lesser angle than the angle of the top lands of the teeth 24C whereby the final 30 to 35 percent of the total desired depth of penetration of the workpiece is achieved by the teeth 24B. The length of the zone of teeth 24A between the reference lines 26 and 28 is preferably such that approximately 1½ revolutions of the workpiece are achieved in such zone and the top lands of the teeth 24A are disposed in a plane parallel to the reference line 22, the full size teeth 24A generating the final form of the teeth on the workpiece.

Thus, in accordance with the present invention, approximately 20 to 25 percent of the total desired depth of penetration of the workpiece is achieved by the teeth 24D in one revolution of the workpiece, after which an additional approximately 45 percent of the total desired depth of penetration of the workpiece is achieved by the teeth 24C in two or more successive revolutions of the workpiece and the final 30 to 35 percent of the total desired depth of penetration is achieved by the teeth 24B in two or more additional successive revolutions of the workpiece. Such a construction increases the useful life of the tools, improves the flow characteristics of the workpiece material during the tooth generating process, improves the quality of the finished workpieces and also reduces the cost of manufacture thereof. It will be understood that, if desired, more than three tapered sections of teeth may be provided with different ramp angles while utilizing the teachings of the present invention.

If desired, the leading and trailing edges of the tapered teeth 24B, 24C and 24D may be provided with varying radii as disclosed in U.S. Pat. No. 2,994,237 and, if desired, one or both of the top corners of the tool may be provided with a chamfer as shown in FIG. 4, or a radius, to eliminate the necessity of undercutting the workpiece. FIG. 5 illustrates a plan view of the teeth 24 when such teeth are intended to generate spur teeth on the workpiece. It will be seen that the tool teeth 24 are perpendicular to the sides of the tool, I.E., perpendicular to the direction of tool movement, but it will be understood that if the tools are to generate helical teeth on the workpiece, the tool teeth will be inclined to the sides of the tool or direction of tool movement.

In the preferred embodiment of the invention illustrated, the body 46 of the tool is illustrated as being provided with lugs 48 and transversely extending openings 50 which facilitate mounting the tool in machines of the type disclosed in U.S. Pat. No. 2,995,964, but it will be understood that other means may be utilized to mount the tools, While a preferred embodiment of the invention has been illustrated and described, various changes and modifications may be made without departing from the spirit of the invention.

What is claimed is:

1. A tool for pressure forming teeth on the periphery of a cylindrical workpiece, said tool including a body having a leading end and a trailing end and being provided with a working face having a plurality of teeth thereon, a first section of said teeth being disposed between said leading end and said trailing end, each of said teeth in said first section having a configuration conjugate to the configuration of the teeth to be formed on the workpiece and having a pitch line, second, third and fourth sections of teeth being disposed between said first section of teeth and said leading end, the tops of the teeth in said second, third and fourth sections sloping toward said leading end at successively increasing angles.

2. A tool as set forth in claim 1 wherein the length of said second and third sections of teeth is greater than the length of said fourth section.

3. A tool as set forth in claim 1 wherein the tops of the teeth in said second section are disposed below the tops of the teeth in said first section, the tops of the teeth in said third section are disposed below the tops of the teeth in said second section and tops of the teeth in said fourth section are disposed below the tops of the teeth in said third section.

4. A tool as set forth in claim 1 wherein the tooth thickness of all of said teeth in said sections as measured on the pitch line thereof is constant from section to section from the teeth in said first section to said leading end.

5. A tool as set forth in claim 1 wherein all of said teeth have a common pitch line.

6. A tool as set forth in claim 1 wherein the distance between the teeth of successive sections as measured on the pitch line thereof is constant from said leading end to said first section of teeth.

7. A tool as set forth in claim 1 including a fifth section of teeth adjacent said trailing end, the tops of the teeth in said fifth section sloping toward said trailing end.

8. A tool for pressure forming teeth on the periphery of a cylindrical workpiece, said tool being provided with a working face having teeth thereon and including a leading end and a trailing end, a first section of teeth between said leading end and said trailing end being fully conjugate to the teeth to be formed on said workpiece and having a pitch line, second, third and fourth sections of teeth disposed between said first section of teeth and said leading end, the tops of the teeth of said second, third and fourth sections of teeth successively decreasing in height at successively increasing angles with respect to the tops of the teeth in said first section.

9. A tool as set forth in claim 8 wherein the length of said second and third sections of the teeth is greater than the length of said first section and said fourth section of teeth.

10. A tool as set forth in claim 9 wherein all of said teeth have a common pitch line and wherein the distance between each of the teeth of each of said successive sections as measured on the pitch line thereof is constant from said leading end to said first section of teeth.

11. A tool as set forth in claim 10 wherein the linear pitch of all of the teeth in all of said sections is constant.

* * * * *